United States Patent [19]

Gniewek et al.

[11] Patent Number: 5,265,082
[45] Date of Patent: Nov. 23, 1993

[54] REWRITABLE MEDIA PROTECTABLE AS WRITTEN-ONCE-ONLY MEDIA AND SYSTEM AND METHOD FOR USE THEREWITH

[75] Inventors: John J. Gniewek; David C. Graves, both of Tucson, Ariz.

[73] Assignee: International Business Machines Corporation, Armonk, N.Y.

[21] Appl. No.: 770,378

[22] Filed: Oct. 3, 1991

[51] Int. Cl.$^5$ ............................................. G11B 5/09
[52] U.S. Cl. ...................................... 369/53; 369/30; 360/137; 360/60
[58] Field of Search .................. 369/53, 30, 50, 33, 369/34, 56, 57, 58, 32; 360/2, 113, 131, 40, 48, 77.03, 78.11, 83, 50, 134, 90, 94, 132, 134, 60, 137; 380/3, 4, 25, 42

[56] References Cited

U.S. PATENT DOCUMENTS

| | | | |
|---|---|---|---|
| 4,038,596 | 7/1977 | Lee | 324/34 |
| 4,104,513 | 8/1978 | Pearce | 360/2 |
| 4,125,881 | 11/1978 | Elge et al. | 360/50 |
| 4,297,729 | 10/1981 | Steynor et al. | 360/40 |
| 4,339,936 | 7/1982 | Pressman | 72/77 |
| 4,413,328 | 11/1983 | Videki, II | 360/91 |
| 4,435,762 | 3/1984 | Milligan et al. | 364/200 |
| 4,452,406 | 6/1984 | Richard | 242/197 |
| 4,578,722 | 3/1986 | Lovgren et al. | 360/60 |
| 4,734,796 | 3/1988 | Grynberg | 360/60 |
| 4,743,490 | 5/1988 | Payling | 428/212 |
| 4,831,611 | 5/1989 | Sasaki et al. | 369/58 |
| 4,833,663 | 5/1989 | Satoh et al. | 369/32 |

FOREIGN PATENT DOCUMENTS

3809398 3/1985 Fed. Rep. of Germany .

Primary Examiner—Aristotelis Psitos
Assistant Examiner—Thang V. Tran
Attorney, Agent, or Firm—M. W. Schecter; J. A. Pershon

[57] ABSTRACT

A system uses prevent and detect mechanisms to enable rewritable data storage media to be operated as a written-once-only media. A physical indication of the media casing serves as an indicator of the write-once-only status of the media. A watermark is magnetically recorded on the media at the factory with a portion of the mark detectable by the system and a portion only detectable by returning to an inspection station for verification. This protects against a complete erasure of all data from the media. A segment write status indication serves to indicate the write-once-only status of each segment of the written data. A portion of the written region, such as the preamble or control field of each segment, contains a status mark written randomly within the area as a status indication that the data was written once or multiple times within that segment. Three status mark areas in each segment write status region provides the minimum space overhead for achieving the desired degree of protection against overwrite or a pattern repetition.

20 Claims, 3 Drawing Sheets

REWRITABLE MEDIA PROTECTABLE AS WRITTEN-ONCE-ONLY MEDIA AND SYSTEM AND METHOD FOR USE THEREWITH

Documents Incorporated by Reference

Milligan et al, U.S. Pat. No. 4,435,762, assigned to the assignee of the present invention, to provide a description of the processing of the data on a tape media system.

Eige et al, U.S. Pat. No. 4,125,881, assigned to the assignee of the present invention, to provide a description of a control circuit usable for a reel-to-reel tape drive.

Rueger, U.S. Pat. No. 4,339,936, assigned to the assignee of the present invention, to show a cartridge tape drive unit usable with the present invention.

Richard, U.S. Pat. No. 4,452,406, assigned to the assignee of the present invention, to show a cartridge tape media usable with the present invention.

TECHNICAL FIELD

The present invention relates generally to digital processing devices, and in particular, to a system employing prevent and detect mechanisms to enable rewritable media to be protectable as a written-once-only media.

BACKGROUND OF THE INVENTION

There occur many instances when it is necessary to store data, especially for long periods of time, and with assurances that the data has remained the same as originally written onto the media. In magnetic media in wide use in today's data processing systems, the big advantage to the magnetic media is that it is readable and writable at will. The data can be written, retrieved many times by sensing the magnetic transitions onto the media, rewritten many times, and again reread many times. Sometimes, however, especially for legal purposes, it is necessary that once written, the data cannot be changed, and if changed, the rewrite is detectable by the data processing unit, or the media can be inspected to detect the rewriting of the data. Heretofore, magnetic media could not be used in a write-once, read many fashion, commonly called WORM media. For this purpose, a physically deformable media, such as optical or plastic recordings were used.

A standard plastic deformation media is used in the well known sound recordings for music, for instance. A spiraled line is scratched into a disk shaped layer of a deformable material, generally a polyvinyl material. The data information, generally sound or music, causes the deformations to be patterned to represent the information. Once patterned, the record or platter can be used only for reading the information back from the record media. Any attempts to change the information can be easily detected because the deformations added will change the deformation of the already recorded information and this could be detected by a microscope, for instance. However, only a small amount of information can be recorded on one disk, especially in comparison to the present magnetic disks and tapes used in the data processing industry. Use of the plastic deformation media would require large storage areas to store the disks and, therefore, are completely unusable. This is especially true when there is a requirement to store image data. Image data requires a very large amount of bytes of information and, therefore, many disks would be required to store one page of image information. This inability to store the vast amounts of information required in a small space led to the development of the optical laser disk.

The optical laser disk can store a vast amount of information. In the WORM type optical disk, the laser beam deforms the media in a pattern similar to that of the plastic deformation recording. In the optical disk recording, the laser beam produces a very small track and the tracks can be located extremely close to each other because the laser beam itself can be focused to an extremely small spot and can be precisely located to place many tracks onto one disk media. The optical disk media provides a good write-only-once media that can be detected if a rewrite is attempted. Therefore, the optical disk media is often used to store information that cannot be changed or, if changed, that change can be detected. The problem with the optical disk media is that each disk is very expensive relative to magnetic media, especially magnetic tape media. Furthermore, if it is ever required to change the information for whatever reason, the optical disk must be discarded and the information rewritten onto another optical disk.

It is, therefore, an object of the present invention to provide a system that permits low cost magnetic media to be usable in a written-once-only format with a detection mechanism for sensing any changes or attempts at changing; i.e., rewriting, the data information recorded on the magnetic media.

Another object of the invention is to provide an enhanced data processing system that uses magnetic media in an indicatable write-once-only procedure.

Summary of the Invention

In accordance with the present invention, a system is disclosed for using a rewritable data storage media as a write-once-only media with prevent and detect mechanisms to prove the unaltered state of the data stored on the media. A physical indication is provided to disclose the write-once-only feature of the media. Any attempt to rewrite data on a write-once-only media is detected. The media may be written with unlimited subsequent additions to the existing data, but any overwrite attempts are detected.

A break-away tab is provided as the physical indication that the magnetic media is a write-once-only type. Removing the tab causes the media to become a rewritable media. A magnetic "watermark" imprinted onto a write-once-only designated magnetic media detects any attempt to bulk erase and rewrite the data on the write-once-only media. The watermark includes a portion that can be detected by the data processing system and, therefore, automatically causes an alert when changed or erased, and can include a portion that is not detectable by the data processing system. In the latter case, the magnetic media would need to be returned to an inspection station to require validation of the watermark. A status indicator for all segments of data written on the media is sensed by placing a magnetic marking onto the media in a segment write status region in each data block of the media. The system is programmed to write a status mark at a random location within a status region each time a data block is written. The system otherwise prevents writing or erasing in the segment write status regions. The mark is randomly located in each data block. The status mark indicates if a data block has been written more than once.

It is, therefore, an object of the present invention to provide an enhanced write-once-only detectable system for use with rewritable magnetic media.

The present invention provides a system that uses a rewritable data storage media in a write-once-only detectable manner comprising means for indicating that the media is a write-once-only media, means for detecting an imprinted magnetic watermark on the media, and means for writing a status mark at a random location within a status region of each data block whenever data is written in the data block, and means for sensing the status mark and to prevent rewriting or erasing within the status region of each data block.

In the preferred aspect of the present invention, a magnetic tape media has a watermark imprinted. The watermark is imprinted when the media is to be designated write-once-only at least in one position on each length of magnetic tape stored in a casing; i.e., a cartridge or a cassette. Each cartridge or cassette includes a physical indicator such as a break-away means. Presence of the break-away means indicates that the magnetic tape is being used in a write-once-only format. Means are provided within the data processing system to indicate the write-only-once status of the media. Magnetically recorded regions are created in each data region as a segment write status indication. The system records some form of mark somewhere in the segment write status region when the data segment is recorded onto the media. The mark is randomly created and randomly located within the segment section of the media.

Another object of the present invention is to provide a system that uses magnetic tape media in a write-once-only format with detectable means that indicates any variation from the write-once-only format.

In the total attribute of the present invention, a control unit, through channel adaptors, accepts the requests from host central processing units to control a device, such as a magnetic tape recording device. The device could also be a magnetic disk or optical recording device. Also, the device could be a plurality of recorders within the aspects of the present invention, such as is useful in a media library data storage hierarchy.

The control of the device for media motion control is through a microprocessor and a device adaptor, and a motion control unit generally in the device. The motion control unit controls the carriage control for handling of the insertion and extraction of the media, the threading mechanism, if the media is a tape held within a cartridge, for placing the media in contact with a transducer for reading and writing onto the media. The motion control also controls the speed and tension of the tape media for correct interaction with the transducer.

The data transferred to and from the media via the transducer is through read and write circuits and formatters to a buffer control which operates under the control of the microprocessor to adapt the data usable by the host CPU into the type of data for storage onto the media device. The data from the channel adaptor is written onto the media by the transducer for storage therein. To retrieve the data, the transducer reads the data from the media as the media is transported past the transducer under control of the motion control and the control unit. A sensor located adjacent to the cartridge indicates to the control unit that this is a write-once-only media or not. If this is a write-once-only media, the watermark placed onto the media can be detected, if desired. The command unit of the control unit directs the format control to record a status mark within the segment write status area in a random format. Each rewriting of the data within that data segment causes another status mark to be located within the segment write status region. Otherwise, the data written onto the tape media is written once onto the tape media, Yet can be read back many times.

Another aspect of the present invention is to provide a method for controlling a data processing system to provide a write once only indication for a rewritable data storage media by a media drive device of the system. The steps include providing a physical indication of the write once only selection on a casing of the data storage media. A watermark is provided on the data storage media having the physical indication on its casing. The watermark includes a device readable portion and a nonreadable device portion by the device portion. The physical indication on the casing of the storage is sensed by the data processing system. The device readable portion of the watermark on the data storage media is sensed by the data processing system. A status mark is recorded at a random location within a segment write status area of each data block of the data storage media each time data is written within each data block if a physical indication is sensed on the casing and a watermark is sensed on the data storage media in the casing.

The lack of a status mark recorded in a data block is an indication of a data block without written data. The presence of a single status mark recorded in a data block is an indication of a data block having once-written data. The presence of multiple status marks recorded in a data block is an indication of a data block having data written multiple times. The sensing of the non device-readable portion of the watermark is one proof of the data storage media not having been bulk erased.

BRIEF DESCRIPTION OF THE DRAWING

The various novel features of this invention, along with the foregoing and other objects, as well as the invention itself, both as to its organization and method of operation, may be more fully understood from the following description of illustrated embodiments when read in conjunction with the accompanying drawing wherein:

FIG. 5 shows a formula for the derivation of the optimized security protection of FIG. 4.

DETAILED DESCRIPTION OF THE DRAWING

In general, the present invention can be used with any processing device that uses a rewritable and erasable media. The present invention is preferable for use with a magnetic media and, in particular, for use with a magnetic tape media stored in a casing, such as a cartridge or cassette. The invention, as described, is shown for use in an IBM 3490 type tape subsystem. It should be evident that any other type of subsystem is adaptable to use with the present invention. The magnetic tape cartridge or cassette could likewise be for storage in a library type system wherein many cassettes are stored and automatically retrieved upon demand. The present invention is equally adapted to many other types of systems by anyone skilled in the art as taught within the following description.

Figure 1:
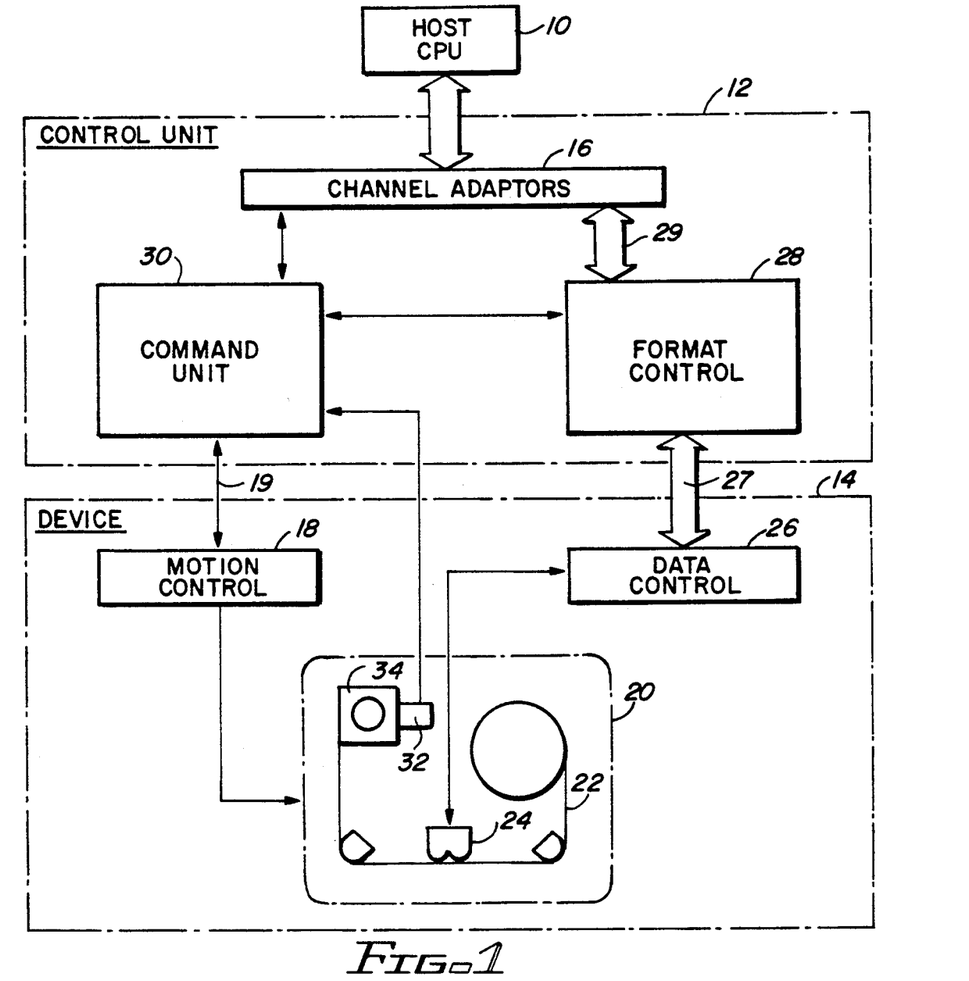
FIG. 1 is a high level block diagram of a data processing system using the present invention.

In general, referring to FIG. 1, a data processing system is controlled by at least one host central processing unit (CPU) 10 to store and retrieve data that is required by the host units. The data processing system includes at least one control unit 12 and at least one device, a magnetic tape recording device 14. The control unit 12 accepts the commands and data from the CPU 10 via channel adaptors 16, and controls itself and the devices accordingly. The devices could be the magnetic tape recording devices 14, as shown in the embodiment of FIG. 1, or magnetic disk or optical recorders.

Figure 2A:
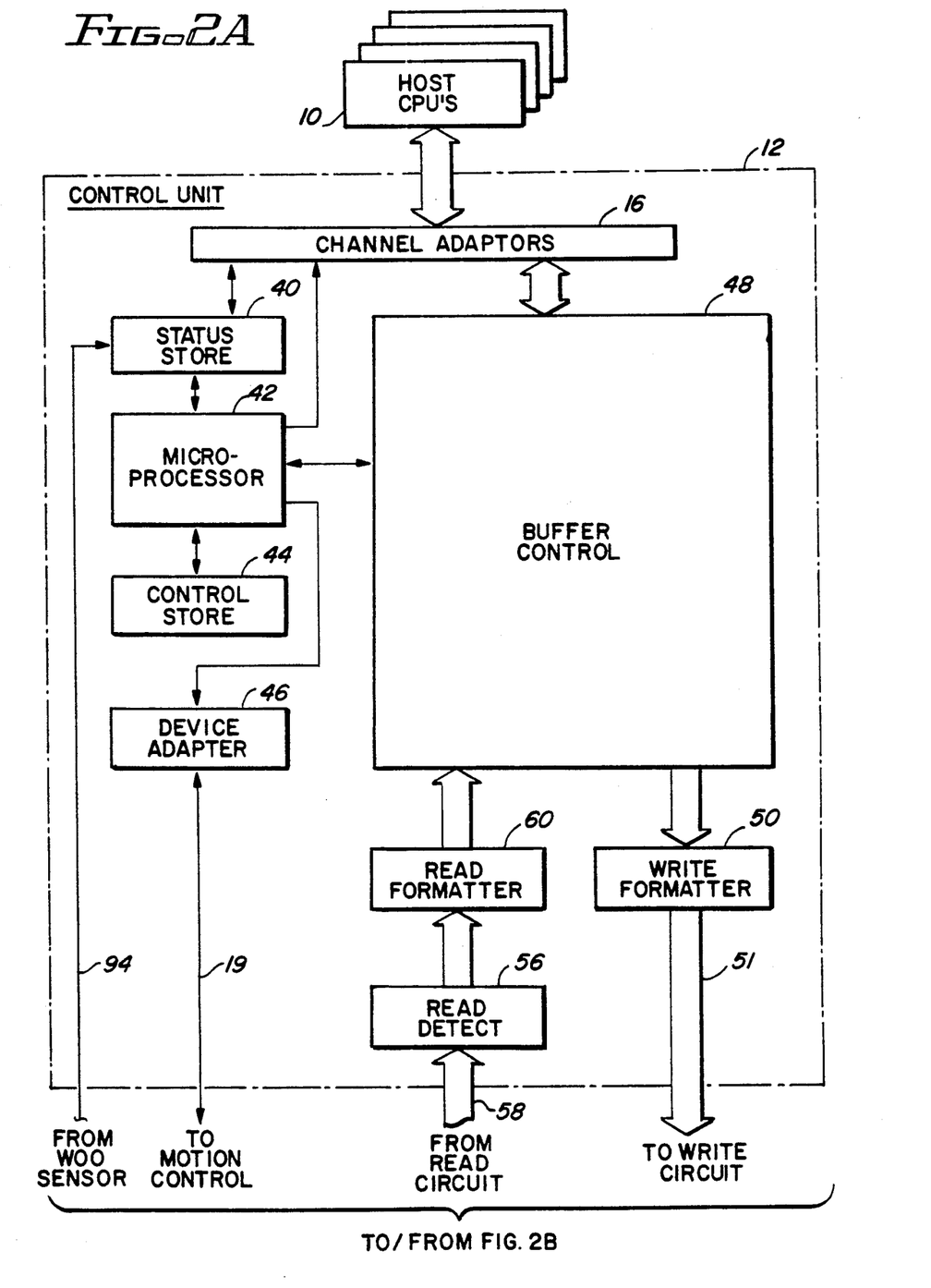
FIGS. 2A and B are more specific flow block diagrams of FIG. 1.
Figure 2B:
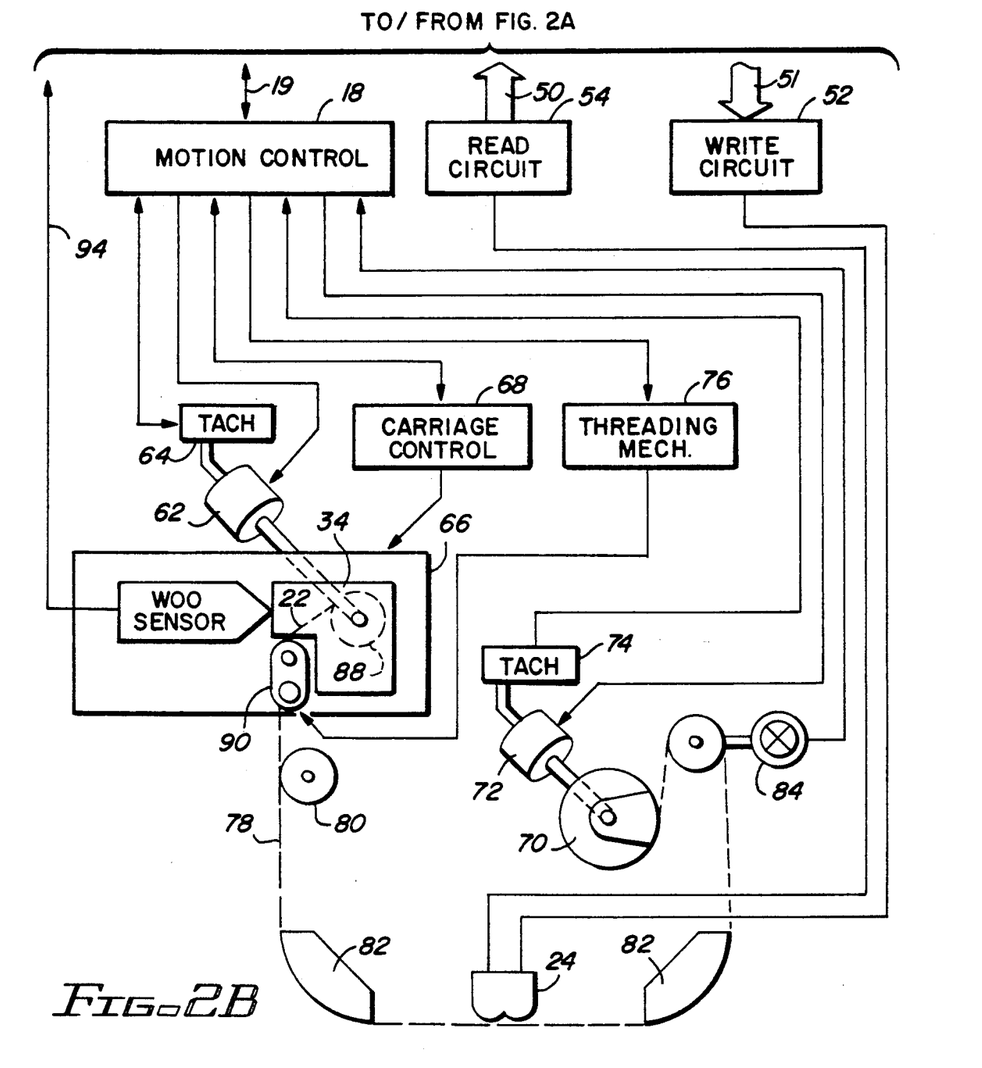

The magnetic tape recording device 14 includes a means for controlling the handling of the tape media, a motion control 18 and the device mechanism in a drive 20 for transporting of a tape 22 past a transducer 24 for writing and reading data to and from the tape media. Generally, a data control 26 provides read and write circuits in the device 14 to operate the transducer 24. The data control 26 is connected by a cable 27 to a format control 28 in the control unit 12. The format control 28 is shown connected by a data cable 29 to the channel adapter 16. The motion control 18 is controlled by a command unit 30 in the control unit 12. The command unit 30 takes the commands transmitted to the channel adaptors 16 by the hosts 10 and controls the operation of the drive 20 via the motion control 18 and the flow of data to and from the channel adaptors 16 through the format control 28 and the data control 26. A write-once-only sensor 32 detects whether a cartridge 34 is a cartridge that has been deemed to be a protected write-once-only cartridge or a standard rewritable cartridge. This information is transmitted to the command unit 30 to control the operation of the control unit 12 as will be discussed later. FIGS. 2A and 2B show a more detailed block diagram of the data processing systems of FIG. 1. FIG. 2A shows a block diagram of the control unit 12 and FIG. 2B shows a block diagram of the device 14. The bottom of FIG. 2A is connected by cable and command lines to the top of FIG. 2B.

Referring to FIGS. 2A and 2B, the command unit 30 of FIG. 1 includes a status store 40, a microprocessor 42, a control store 44, and a device adaptor 46. A buffer control 48 operates under control of the microprocessor 42 to store the data written on tape 22 by a write formatter 50 and a write circuit 52 of FIG. 2B which, in turn, is connected to the transducer 24. The buffer control 48 also controls the data flow on a read cycle to store the data processed by a read circuit 54 from the transducer 24 and transmitted to a read detect circuit 56 over a connecting cable 58. The read detect circuit 56 is connected to a read formatter 60 which, in turn, is connected to the buffer control 48.

The tape recording device of FIG. 2B shows the drive 20 under control of the motion control 18 to accomplish the controlled transporting of the tape 22 past the transducer 24 to accomplish the reading and writing of the magnetic transitions from and to the tape 22 and is useful in the present invention. The tape recording device 14 includes a supply reel motor 62 and a tachometer control 64, a carriage 66, and a carriage control 68, a take-up reel 70 and its motor drive 72 and tachometer control 74, a threading mechanism 76, various controls of a tape path 78, such as an idler wheel 80, compliant tape guides 82, and a tape tension control 84. The tape media 22 of this disclosed embodiment is contained in a cartridge 86 shown placed into the carriage 66. The cartridge 86, besides the tape 22, includes a supply reel 88 and a leader block 90, shown connected for threading by the threading mechanism 76. The write-once-only (WOO) sensor 32 senses whether the cartridge 86, placed into the carriage 66, is one that has been slated to be protected against multiple rewrites. The WOO sensor 32 senses the physical indicator of the cartridge 86 and, via a control line 94, indicates the type of cartridge being used to the status store 40. The physical indicator on the cartridge could be a break-away tab, for instance. In the drawings, like reference numbers indicate like parts and structural features in the various Figures of the drawing.

Reference is made to the Milligan et al., patent to show a description of the processing of the data on a tape media system; to the Eige et al., patent to show a description of a control circuit usable for a reel-to-reel tape drive as shown in FIG. 2B; to the Rueger patent to show a cartridge tape drive unit and the threading mechanism 76; and to the Richard patent to show a cartridge tape media of the device useful as the cartridge 86.

Figure 3:
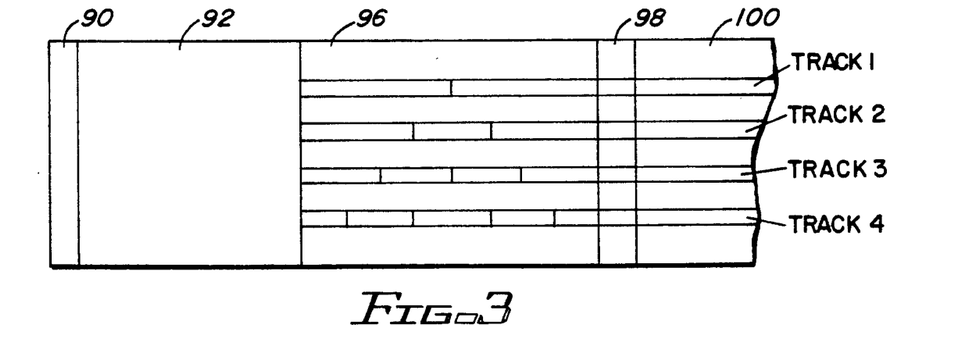
FIG. 3 shows a section of magnetic tape prepared according to the present invention.

FIG. 3 shows a portion of the tape media 22 according to the present invention. As stated previously, the tape media 22 includes a leader block connection 90 for connecting the magnetic tape into the tape device. After the leader block connection 90 is a length of tape 92 which depicts the length of tape which is placed over the take-up reel 70 to cushion the interaction of the tape media 22 to the take-up reel 70 to prevent tape creases from occurring which could affect the reading of the magnetic transitions from the media. After this, a watermark section 96 is encoded onto the magnetic tape, if this is to be a write-once-only media. The watermark itself can be any series of magnetic transitions placed onto any number or all of the tracks of the tape media in any pattern which could prove useful. The watermark section 96 can only be written on at a special station or at the factory. The pattern, therefore, can cover across all of the tracks of the media. In one embodiment of the present invention, the watermark section 96 can be sensed by the transducers in order to indicate to the system that there has been no tampering, such as bulk erasing of the tape in the cartridge. Another type of watermark that can be placed in the watermark section 96 could be a transverse recording into one or all of the tracks. The transverse transitions would not be readable by the transducer 24 and, therefore, could not be duplicated except by the special equipment which would be available only at an inspection station. For this embodiment, the watermark includes one portion that can be sensed by the transducer 24 over one or all of the tracks onto the media. In FIG. 3 only four tracks, tracks 1-4, are shown developed on the tape media, but it is evident that many more tracks are capable of being placed onto the half-inch tape contained in the cartridge useful in the IBM 3490E tape drive. The IBM 3490E tape drive is capable of recording on and reading from 36 tracks. The four tracks are shown merely for ease of description of the tape according to the present invention.

After the watermark section 96, a start read or write signal is placed into a section 98. A beginning-of-tape (BOT) and/or an end-of-tape (EOT) signal can be placed into section 98. The BOT and EOT signals indicate the starting and stopping of the placement of the data onto the tracks. The cartridge in the IBM 3490 tape drive operates in both forward and reverse directions and, therefore, an indication to show where the data begins and to control the ending of the data is necessary. The data itself is contained in the remaining portions of the tape indicated as section 100.

Referring now to the Figures, a data processing system is shown to include a magnetic tape recorder storage subsystem connected via its control unit 12 to the host system 10. The magnetic tape recorder storage subsystem includes the control unit and the magnetic tape device 14. The control unit 12 provides data transfers between a plurality of devices, one indicated as being the reel-to-reel type of magnetic tape recorder 14 and the host system 10 via the plurality of channel adaptors 16. The total subsystem status is maintained in the control unit 12 via the status store 40. The status store 40 includes a plurality of registers containing bytes relating to the byte status, the buffer status, the tape media status, and the like. Such status information reflects the selection status of the device 14, the cartridge status, and all other status necessary for operating the storage subsystem.

The programmed microprocessor 42 operates in accordance with a microcode program stored in the control store 44. Such programs enable the microprocessor 42 to completely manage the buffer control 48 to provide and supervise the data flow to the device 14. A device adaptor 46, controlled and supervised by the microprocessor 42, controls the operation of the motion control system 18, via a control line 19. The microprocessor 42, using normal techniques, selects the microprograms of the control store 44. Control data is supplied from the control store 44 including microprogramming instruction words.

The entry of the cartridge 34 into the carriage 66 activates the carriage control 68 which, in turn, causes the motion control unit 18 to activate the motor 62. If the cartridge is a write-once-only cartridge, the cartridge will activate the WOO sensor 32 and the status of the cartridge is stored in the status store 40. The motion control 18 directs a threading operation by activating the threading mechanism 76 which will pull the tape through its path past magnetic head 24. The watermark from the watermark section 96 (see FIG. 3) is sensed by the transducer 24. The watermark transitions are sensed by the read circuit 54 and through data cable 58 is sensed by the read detect 56 and the read formatter 60. The information is transmitted to the buffer control 48 which, in turn, signals to the microprocessor 42 that the presence of a watermark has been sensed.

The writing of information onto the magnetic tape 22 is accomplished through the write formatter 50 which places the data to be written into its format for placement onto the tape. Thus, the microprocessor 42, through the buffer control 48, causes a segment write status indication to be written and randomly placed within a segment write status section when the data segment is written onto the tape. A location of the status mark is determined by a random timing feature incorporated in the microprocessor and not accessible to any user of the system. The data information to be written onto the magnetic tape, together with the segment write status indication, is transmitted by the data cable 51 to the write circuit 52. The write circuit 52, in turn, activates the transducer 24 to write the data and the segment write status mark onto the tape media.

The write-once-only status of the cartridge does not in any way affect the reading or retrieval of the data information from the tape media. The magnetic transducer 24 will sense the magnetic transitions written onto the tape 22 and will direct its analog output to the read circuit 54. The read circuit 54 amplifies the analog signals received from the magnetic transducer 24 and directs its output via the cable 58 to the read detect 56. The read detect circuit 56 in turn, converts the analog signal to the digital signal required through the read formatter 60 whose output is then directed to the buffer control 48. The data information is then directed to the channel adapter 16 for use by the host CPU 10.

The present invention provides a system by which a rewritable media may be used in applications requiring the capacity to restrict the writing of data onto the media to a single time for any one point on the media. Since it is rare that the entire media is filled during the writing of a single group of data onto the media, the system provides the ability to write data according to the block size criteria of the system and control the segment write status indication circuitry to place a status mark random among a predetermined section of the data recording region. The system always records a status mark somewhere in this section of the data recording region when writing that data segment.

The physical indication of the write-once-only media type can be any one of the many physical devices used on a cassette or a cartridge that indicates a read only media. The indication must be a physical indication, such as a break-away tab of the standard video cassette recorder or audio cartridge, or any other indication located in any section physically on the cassette or cartridge case. The presence or absence of the break-away tab can be apparent to the user and can then be sensed by the WOO sensor 32 to indicate that this media and this cartridge is formatted for write-once-only operation. The systems senses the physical indication plus it then detects the watermark from the watermark section of the tape as an indication that the write-once-only operation is required. The user may break away the physical indication to use the cassette or the cartridge in a rewritable mode if the tab physical indication requires the presence of the tab to indicate the write-once-only operation. The cassette or cartridge from which the physical indication has been removed in this state can then only be used as a rewritable media regardless of any status of the watermark. The watermark status together with the rewrite indication by the physical tab, for instance, can signal to the system that this cartridge is being placed into an illegal operation, a rewrite operation. It is possible that a cassette or a cartridge may be manufactured without the physical indication or with a permanent physical indication and, therefore, the cartridge or cassette may only be used as a rewritable media. In this case, there is no requirement to add the watermark to these cassettes. Cassettes or cartridges where the media has been completely erased; i.e., no watermark is detectable, but retains the intact physical indication, will cause an error operation if the write operation is attempted.

In the preferred embodiment, the presence of a detectable watermark is required if the device is to operate in the write-once-only mode. Absence of a detectable watermark indicates either that the media is illegal and that a write operation or an erase operation was performed illegally, or the absence may indicate that the media may only be used in its rewritable format. Absence of a nondetectable watermark and the presence of a device detectable watermark indicates fraud. The data written on this media may not be a true write-once-only media. Validation of the nondetectable watermark requires the return of the media to an inspection station such as would be available only at the factory for instance. Therefore, detection or fraud attempts of this type may only be made by examination of the media at the inspection station.

The type of watermark placed in the watermark section 96 can be of any type satisfying the requirements of this invention. The objective of the watermark is to provide a means by which the system can recognize that the media has not been degaussed or erased and, therefore, the media retains the features expected of a newly manufactured tape intended for write-once-only application. The watermark also serves to provide a means for confirmation, by manual processes at an inspection station, that the tape was newly manufactured write-once-only tape at the time the data was written.

The nature of the watermark will vary considerably depending on the specific technology utilized for recording; i.e., whether a magnetic tape, a magnetic disk, or an optical disk is used. The example discussed herein is for the preferred embodiment of a magnetic tape media. It is expected that a specific area of the tape media will be reserved for the watermark. This region will be the region, watermark section 96, that the control unit will examine and sense upon loading of the cartridge holding the tape media prior to a read or write operation. The watermark should be a special magnetic imprint or recorded pattern. The watermark must be capable of being sensed by the system at the time the media is loaded onto the tape drive and will indicate that data is to be written only in the write-once-only mode. If the watermark is not detected, the system must write data onto the media in such a way that the segment write status region will be obliterated for each section of data. Thereafter, the data will be recognized as being placed on a nonwrite-once media and, thus, is media that contains rewritable or rewritten data. Once the segment write status region is obliterated, it cannot be regenerated without erasing the entire tape media. Erasing the entire tape media will also remove the watermark and ensure that the media can be easily identified as a media on which the data has been changed through a rewrite operation.

A portion of the watermark is detectable by the system and the watermark should be made such that another portion is not capable of being sensed by the system, but is detectable easily within a laboratory utilizing special equipment. It may be necessary to confirm that a certain tape media has not been tampered with; i.e., rewritten on, and, therefore, retains valid write-once-only data. Assuring that both the detectable and the nondetectable portions of the watermark retain the properties of the original magnetic imprint is a key basis for validation of the write-once-only status. The nondetectable portion of the watermark will make it difficult, without special laboratory equipment, to duplicate the portion of the watermark that is not detectable by the system. A magnetic head can detect recorded information that is properly oriented with respect to the alignment of the head gap. The portion of the watermark that is detected by the system will have features oriented such that the existing data read heads of the transducer will easily be able to detect the watermark. Thus, this portion of the watermark can include data transitions located in specific tracks of the magnetic tape parallel to the data magnetic transitions; i.e., transverse to the direction of motion of the tape media. The nondetectable portion of the watermark can preferably have features recorded on the magnetic tape that are orthogonal to the alignment of the head gap; i.e., parallel to the motion direction of the magnetic tape media. Assuming a multitrack tape format with information recorded longitudinally down the length of the tape, the detectable portion will be oriented in the same direction as the data is recorded and the nondetectable portion will be oriented such that scanning across the width of the tape will be required for detection.

The original generation of the watermark can be accomplished by recording different portion of the watermark independently by using different transducers with different orientations. The detectable portion is recorded with the head aligned in a manner similar to the data recording transducers. The nondetectable portion is then recorded with a second transducer moving transverse to the data recording transducers. Another means for the generation of the watermark may be a magnetic imprint applied to the media at the factory in a single operation. Again, a portion of the imprint is oriented for detection by the data transducers, and a portion is oriented such that it cannot be detected by the data transducers and, thus, will be detectable only by special equipment.

The use of the physical indication of the cartridge status and the use of watermarks on the media serve to indicate the status; i.e., whether write-once-only or rewritable of all of the media in that cartridge. The portion of the tape media devoted to data recording may be subdivided into segments. If the media is write-once-only, a status of each segment of the media needs to be indicated. This permits the tape media to be utilized as write-once-only without the requirement to completely fill the tape media in a cartridge immediately with the first use. Each segment of the data, usually within the preamble or the control field of the data, contains a special region called the segment write status indication region that indicates the write-once-only status of that segment of the tape media in that cartridge. The segments may all be of the same size, e.g., sectors or fixed block size, or may vary depending on the size of individual data sets; e.g., appended records or blocks. Fixed or variable segments are device-architecture dependent. The requirement is that a segment write status indication be placed into each segment for either type o architecture.

To accomplish a segment write status indication section, a portion of the tape media devoted to the recording of the data remains in the demagnetized state until data is to be recorded into that particular segment. The nonmagnetically recorded regions are permitted to remain in specific portions of the preamble or a control field for each segment. The system always records a status mark somewhere in this region when writing that data segment. The location of the mark is determined by a random timing feature in the microprocessor. The recording of the status mark is not accessible by the user of the system. The random feature of the status mark makes it highly improbable that a second recording of a data segment will provide an identical status mark. The segment write status indications are: A completely void status mark implies an unrecorded data segment; a single mark pattern within the segment write status indication region indicates that the segment includes data written-once-only; and a multiple status mark pattern, or no remaining segment write status indication region, indicates that that data segment has been rewritten multiple times.

The segment write status region indicates whether the accompanying data segment has been written only once or more than once. This is accomplished by writing a status mark pattern in the segment write status region. The probability of an identical repeat mark pattern from subsequent rewrites must be minimized. This will maximize assurance that fraudulent overwrite data can be detected. The status mark pattern is generated by the control of the write current to the transducer to write a specially created pattern in the segment write status region. The objective is for only a single status mark to be written within the segment write status region if the associated data segment has been written only once with data information. Multiple data writes in the same data segment would leave multiple status write patterns, or possibly obliterate the entire region. A segment that is unused, thus, will have a completely empty segment write status region and a segment written once will contain one, and only one, status mark within the segment write status region. Detection of any other signal indicates multiple writings and voids the write-once-only character of the data for that segment.

To ensure that any subsequent status marks are not superimposed upon the first status mark, the timing or the location of the segment write status region should vary randomly for each write operation.

To maximize the use of the recording surface of the tape media for data, it is desirable to minimize all non-data features recorded on the tape media. This includes the minimization of the size of the segment write status region. Increasing the size of the segment write status region permits a large number of possible locations for the random placement of the status mark. A large number of potential locations assures that it will be highly unlikely that multiple status marks will coincide. An analysis that determined the optimum length for the segment write status region to ensure maximum potential fraud detection, yet minimizing the segment write status region length, calculates that three segment write status regions be provided. The analysis also provides a means for calculating the probability of status mark coincidence.

Figure 4:
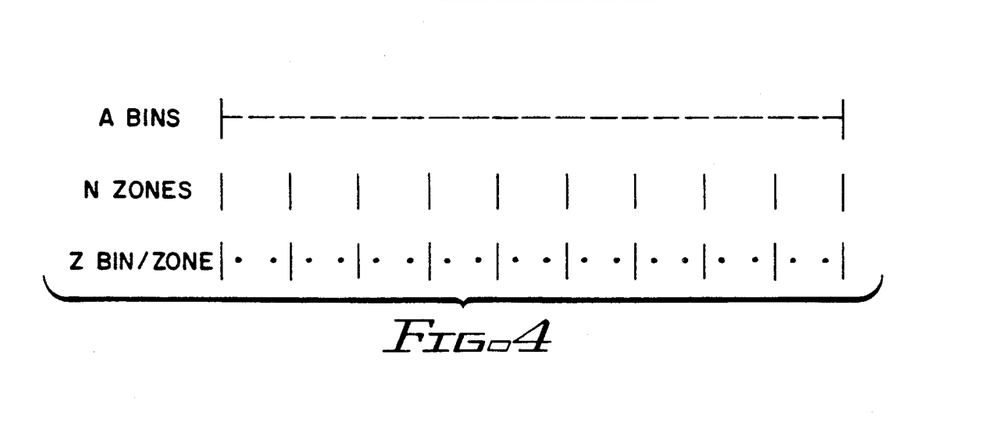
FIG. 4 shows an optimized security protection of a segment write status region for this invention.

In the analysis, referring to FIG. 4, consider that the segment write status region is divided into A number of "bins." Each bin is a region large enough to contain an individual written status mark with spatial and temporal separation permitting detection of neighboring status marks as independent entities. Consider also that the set of A bins is subdivided into N zones, each with X bins. Therefore, the number of zones times the number of bins in each of the zones equals the number of bins. The nature of the system is to randomly select a bin into which a single status mark will be written. The analysis determines the value of X that minimizes the total number of bins required for assuring the required probability of fraud detection. In FIG. 4, for a given number of bins A, the value of X, the number of bins in each zone and, therefore, the number of zones in the segment write status region for maximum security protection can be found.

The optimum length determination of the segment write status region can be determined using a differential equation. The derivative of the number of bins per zone that minimizes the write status space overhead for a required degree of fraud protection is as follows. Let PZ equal the probability that a zone pattern will be repeated upon a rewrite function and let PT equal the probability that the total segment write status region pattern will be repeated. A required degree of protection is selected; e.g, one failure in ten raised to the twentieth power number of patterns. Therefore, PZ equals $1/X$ and PT equals $(1/X)$ raised to the Nth power which equals $(1/X)$ raised to the $(A/X)$ power and $1/PT$ equals X raised to the $(A/X)$ power. The differential formula for the probability is that the differential of the inverse of PT with respect to the differential of X is equal to the differential of X raised to the A/X power with respect to the differential of X. The equation is solved using differential calculus. The optimum number of bins per zone is found by setting the term $(1-\ln X)$ equal to zero. Then X is found to be equal to e. The optimum number of bins per zone that minimizes A and, hence, the non-data space on the tape, is found to be when X equals e, where e equals 2.7183. Rounding to an integer number of bins per zone produces the optimum number of three bins per zone.

The present invention provides an external indication on the casing of the media unit; i.e., cassette, cartridge, and so-forth, that the media is for write-once-only, or rewritable application. Each segment of the written formatted media may be monitored for recorded status of whether it has never contained written data, whether written data has been written only once, or whether written data has been written more than once. Also, a watermark is provided to determine if the media retains specific magnetic features; that is, it indicates if the media has been erased or degaussed. If the modification of the data is attempted once the data had been written, erasing or degaussing the media before the second write can be detected by reviewing the watermark.

The principles of the present invention have now been made clear in an illustrated embodiment. There will be, immediately obvious to those skilled in the art, many modifications of the structure, arrangement, proportions, the elements, materials and components used in the practice of the invention. For instance, many different types of physical indications on the media casing; i.e., the tape cartridge or the tape cassette, may be used and many are already well known in the art. Further, the type of watermark on the magnetic media to protect against a bulk erasure or a degaussing of the media is likewise well known with many different types presently available and many can be patterned easily within the requirements of the user. Tape media is the preferred embodiment because of the low cost of the media. But, the discussion of the tape media in the preferred embodiment is not to limit the present invention to tape media only. It being evident that any writable media can be substituted within the knowledge of those skilled in the art without departing from the present invention. The appended claims are, therefore, intended to cover and embrace such modifications within the limits only of the true spirit and scope of the invention.

What is claimed is:

1. A data processing system for providing a write-once-only indication to a rewritable media, said system comprising:
 a casing for the rewritable media;
 casing indicating means on the casing for indicating the write-once-only selection of the media;

a control unit including channel adaptors for the transmission of data to and from a central processing unit under command of the central processing unit, a command unit to process command controls, and a format control;

a device including a drive for transporting the media past a transducer, a motion control under control of said command unit for controlling said drive, a data control under control of said command unit to write data onto the media in data storage segments according to said format control and to retrieve data from the media as the drive transports the media;

a sensing means in said device for generating a write-once-only indication signal in response to the sensing of the casing indication means;

a watermark imprinted on the media, said watermark having a device-readable portion and a nondevice-readable portion; and means in said command unit responsive to said indication signal for controlling said format control, said data control retrieving the watermark device-readable data information from the media and sending the watermark information to said command unit, said format control responsive thereto to cause said data control to write a segment write status indicator status mark on the media when data is written in that data segment of the media;

said status mark being placed on the media in a non-data containing section of each data storage segment and representative of the writing of data in that data storage segment.

2. A data processing system as defined in claim 1 wherein the presence of an indication means on the casing, the presence of the device-readable and nondevice-readable portions of the watermark on the media, and the presence of only one status mark in each data storage segments containing written data and no status marks in the data storage segments containing no written data is an indication that the media has had data written-once-only in each data storage segment containing data.

3. A data processing system as defined in claim 1 wherein the lack of a status mark recorded in a data storage segment is an indication of a data storage segment containing no written data.

4. A data processing system as defined in claim 1 wherein the presence of a single status mark recorded in a data storage segment is an indication of a data storage segment having once-written data.

5. A data processing system as defined in claim 1 wherein the presence of multiple status marks recorded in a data storage segment is an indication of a data storage segment having data written multiple times.

6. A data processing system as defined in claim 1 further including means for sensing the nonmachine readable portion of the provided watermark as one proof of the data storage media not having been bulk erased.

7. A data processing system as defined in claim 1 wherein the number of places in the non data containing section for writing a status mark is three.

8. A method for controlling a data processing system to provide a write-once-only indication for a rewritable data storage media stored in a casing, the media capable of having data written on and read from by a media drive device, comprising the steps of:

providing an indication of the write-once-only selection on the casing of the data storage media;

providing a watermark on the data storage media having the indication provided on its casing, said watermark having a device-readable portion and a nondevice-readable portion;

sensing the provided indication on the casing of the data storage media;

sensing the provided device-readable portion of the provided watermark on the data storage media; and recording a status mark at a random location within a status region of each data block of the data storage media each time data is written within each data block if the indication is sensed on the casing and a watermark is sensed on the data storage media in the casing.

9. A method as defined in claim 8 wherein the lack of a status mark recorded in a data block is an indication of a data block without written data.

10. A method as defined in claim 8 wherein the presence of a single status mark recorded in a data block is an indication of a data block having once-written data.

11. A method as defined in claim 8 wherein the presence of multiple status marks recorded in a data block is an indication of a data block having data written multiple times.

12. A method as defined in claim 8 further including the step of sensing the nondevice-readable portion of the provided watermark as one proof of the data storage media not having been bulk erased.

13. A data processing system for providing a write once only indication for storage onto a media capable of being rewritten and having a casing including an indication of a write-once-only selection, said media including a system detectable and a nonsystem detectable watermark, said system comprising:

a control unit including channel adaptors for the transmission of data to and from a central processing unit under command of the central processing unit, a command unit to process command controls, and a format control; and a device including a drive for transporting the media past a transducer, a motion control under control of said command unit for controlling said drive, a data control under control of said command unit to write data onto the media according to said format control and to retrieve data from the media as the drive transports the media, and a means for generating a write-once-only indication signal in response to sensing of the indication of the write-once-only selection included on the casing; and means in said command unit responsive to said indication signal for controlling said format control, said data control retrieving the watermark system readable data information from the media and sending the watermark information to said command unit, said format control responsive thereto to cause data data control to write a segment write status indicator status mark in each data storage segment wherein data is to be written;

said status mark being placed on the media in a non-data containing section of the data storage segment and representative of the writing of data in that data segment.

14. A system for providing a write-once-only indication to a rewritable media, said system comprising:

a casing means for enclosing the rewritable media;

casing indicating means on the casing means for indicating the write-once-only selection of the media;

a sensing means for generating a write-once-only indication signal in response to the sensing of the casing indicating means;

a watermark means imprinted on the media, said watermark having a device-readable portion and a nondevice-readable portion;

a format control means for controlling the writing of data on the media in data storage segments;

control means responsive to said write-once-only indication signal from said sensing means for controlling said format control, said control means retrieving the watermark device-readable data information from the media and sending the watermark information to said format control means, said format control means responsive thereto to cause a segment write status indicator status mark to be written on the media;

said status mark being placed on the media in a nondata containing section of each data storage segment and representative of the writing of data in that data storage segment.

15. A system as defined in claim 14 wherein the presence of an indication means on the casing, the presence of the device-readable and nondevice-readable portions of the watermark on the media, and the presence of only one status mark in the data storage segments containing written data and no status marks in the data storage segments containing no written data, is an indication that the media has had data written-once-only in each data storage segment containing data.

16. A system as defined in claim 14 wherein the lack of a status mark recorded in a data storage segment is an indication of a data storage segment without written data.

17. A system as defined in claim 14 wherein the presence of a single status mark recorded in a data storage segment is an indication of a data storage segment having once-written data.

18. A system as defined in claim 14 wherein the presence of multiple status marks recorded in a data storage segment is an indication of a data storage segment having data written multiple times.

19. A system as defined in claim 14 wherein the number of places in the nondata containing section for writing a status mark is three.

20. A system as defined in claim 14 further including means for sensing the nonmachine readable portion of the provided watermark as one proof of the data storage media not having been bulk erased.

* * * * *